US012747135B2

(12) United States Patent
Serkh et al.

(10) Patent No.: US 12,747,135 B2
(45) Date of Patent: Sep. 29, 2026

(54) ELEVATOR SUSPENSION MEMBER MONITORING

(71) Applicant: OTIS ELEVATOR COMPANY, Farmington, CT (US)

(72) Inventors: Alexander Serkh, Troy, MI (US); Jun Ma, Farmington, CT (US); Shari R. Parillo, Berlin, CT (US); David R. Torlai, Torrington, CT (US); Alper Caliskan, Gien (FR); Ernesto Sarralde, Pozuelo de Alarcon (ES); Andres Monzon, Leganes (ES)

(73) Assignee: OTIS ELEVATOR COMPANY, Farmington, CT (US)

( * ) Notice: Subject to any disclaimer, the term of this patent is extended or adjusted under 35 U.S.C. 154(b) by 975 days.

(21) Appl. No.: 18/059,452

(22) Filed: Nov. 29, 2022

(65) Prior Publication Data

US 2024/0174490 A1 May 30, 2024

(51) Int. Cl.
*B66B 7/12* (2006.01)

(52) U.S. Cl.
CPC .................................. *B66B 7/1223* (2013.01)

(58) Field of Classification Search
CPC ... B66B 7/1223; B66B 7/1215; B66B 7/1207; B66B 5/02
See application file for complete search history.

(56) References Cited

U.S. PATENT DOCUMENTS

| | | | | |
|---|---|---|---|---|
| 6,123,176 | A * | 9/2000 | O'Donnell | B66B 7/1215 187/393 |
| 6,653,943 | B2 * | 11/2003 | Lamb | D07B 1/148 340/552 |
| 7,123,030 | B2 * | 10/2006 | Robar | G01N 27/82 324/693 |
| 7,494,004 | B2 | 2/2009 | Stolyar et al. | |
| 7,779,994 | B1 | 8/2010 | Travis | |
| 9,347,372 | B2 | 5/2016 | Spohn et al. | |
| 9,599,582 | B2 | 3/2017 | Fargo et al. | |
| 9,731,939 | B2 | 8/2017 | Sun et al. | |
| 9,796,561 | B2 * | 10/2017 | Guilani | B66B 5/02 |
| 9,862,571 | B2 | 1/2018 | Sun et al. | |
| 9,932,203 | B2 * | 4/2018 | Robibero | B66B 7/062 |
| 10,486,935 | B2 * | 11/2019 | Hida | B66B 5/0018 |
| 10,597,236 | B2 | 3/2020 | Kleczewski | |
| 11,014,784 | B2 | 5/2021 | Henneau | |

(Continued)

FOREIGN PATENT DOCUMENTS

| | | | |
|---|---|---|---|
| DE | 10201000117 | A1 | 7/2011 |
| WO | 2004094276 | A1 | 11/2004 |

*Primary Examiner* — Rina I Duda

(74) *Attorney, Agent, or Firm* — Carlson, Gaskey & Olds, P.C.

(57) ABSTRACT

A method of monitoring a suspension member of an elevator system includes determining a condition of the suspension member based on a combination of an electrical inspection technique, a use indicator corresponding to an amount of use of the suspension member, and a mechanical characteristic indicator corresponding to at least one mechanical characteristic of the suspension member. The suspension member is removed from service based on an indication from the electrical inspection technique, the mechanical characteristic indicator, and the use indicator satisfying at least one predetermined combination of criteria.

18 Claims, 3 Drawing Sheets

(56) References Cited

U.S. PATENT DOCUMENTS

| | | | |
|---|---|---|---|
| 11,365,093 B2 | 6/2022 | Dold et al. | |
| 2004/0262132 A1 | 12/2004 | Pauley et al. | |
| 2007/0102264 A1 | 5/2007 | Wallace et al. | |
| 2010/0065405 A1 | 3/2010 | Lagneaux | |
| 2015/0166305 A1* | 6/2015 | Kalliomaki | B66B 7/064 187/254 |
| 2018/0155156 A1* | 6/2018 | Kuczek | B66B 9/00 |
| 2018/0215584 A1* | 8/2018 | Henneau | G01R 31/008 |
| 2021/0323790 A1 | 10/2021 | Robibero et al. | |

* cited by examiner

ELEVATOR SUSPENSION MEMBER MONITORING

BACKGROUND

Elevator systems are in widespread use for carrying passengers between various levels in buildings, for example. Some elevator systems are traction-based in which a suspension assembly, sometimes referred to as roping, suspends the elevator car and a counterweight. The suspension assembly also facilitates movement of the elevator car when needed. Traditional suspension assemblies include round steel ropes. More recently, elevator systems have included other types of suspension members, such as flat belts or other types of ropes that have multiple steel cords encased in a compressible polymer jacket.

Traditional round steel ropes were typically inspected using a manual process including manually and visually observing the condition of the outer surfaces of the rope. Coated belts and other coated ropes cannot be inspected that way. Electrical inspection techniques have been developed that include applying electric current to at least some of the steel strands and measuring an electrical characteristic, such as resistance, to obtain information indicating a condition of the belt or coated rope. While such techniques have proven useful, they are not without shortcomings, such as false alarms in which the electrical inspection device triggers an alarm indicating a need to remove the belt or rope from service when its actual condition is satisfactory for continued use within the elevator system. Such false alarm conditions are inconvenient to building owners because they remove elevator systems from service unnecessarily. Additionally, such premature or false alarms increase the cost to elevator system providers because the belt or coated rope has to be replaced before the actual service life of the belt or rope has expired.

SUMMARY

An illustrative example method of monitoring a suspension member of an elevator system includes determining a condition of the suspension member based on a combination of an electrical inspection technique, a use indicator corresponding to an amount of use of the suspension member, and a mechanical characteristic indicator corresponding to at least one mechanical characteristic of the suspension member. The suspension member is removed from service based on an indication from the electrical inspection technique, the mechanical characteristic indicator, and the use indicator satisfying at least one predetermined combination of criteria.

In addition to one or more of the features described above, or as an alternative, the method includes determining to leave the suspension member in service when only the electrical inspection technique satisfies one of the criteria and neither of the mechanical characteristic indicator or the use indicator satisfies another one of the criteria.

In addition to one or more of the features described above, or as an alternative, the method includes determining to remove the suspension member from service when the electrical inspection technique satisfies one of the criteria and at least one of the mechanical characteristic indicator or the use indicator satisfies another one of the criteria.

In addition to one or more of the features described above, or as an alternative, the method includes instigating a shutdown of the elevator system based on determining to remove the suspension member from service.

In addition to one or more of the features described above, or as an alternative, the criteria include at least a first criterion, a second criterion, a third criterion, and a fourth criterion; and determining the condition of the suspension member based on the combination of the electrical inspection technique, the use indicator, and the mechanical characteristic indicator comprises: determining the condition of the suspension member based on the electrical inspection technique until the first criterion is satisfied wherein the electrical inspection technique indicates an undesired condition of the suspension member; subsequent to the first criterion being satisfied, determining the condition of the suspension member based on the use indicator and the mechanical characteristic indicator until the second criterion is satisfied wherein the use indicator exceeds a use threshold or the mechanical characteristic indicator exceeds a mechanical characteristic threshold; and subsequent to the second criterion being satisfied, determining whether the third criterion is satisfied wherein the mechanical characteristic indicator exceeds the mechanical characteristic threshold or the fourth criterion is satisfied wherein the use indicator exceeds the use threshold and the electrical inspection technique continues to indicate the undesired condition of the suspension member.

A non-transitory storage medium containing a plurality of processor-executable instructions that, when executed by at least one processor, cause the at least one processor to perform the method of any of the previous paragraphs.

In addition to one or more of the features described above, or as an alternative, determining to remove the suspension member from service comprises leaving the suspension member in service until determining that the third criterion is satisfied or the fourth criterion is satisfied.

In addition to one or more of the features described above, or as an alternative, determining the condition of the suspension member based on the combination of the electrical inspection technique, the use indicator, and the mechanical characteristic indicator further comprises determining that the first criterion is no longer satisfied if the electrical inspection technique no longer indicates the undesired condition of the suspension member and neither of the third or fourth criterion are satisfied.

In addition to one or more of the features described above, or as an alternative, the electrical inspection technique comprises determining an electrical resistance of at least one electrically conductive tension member of the suspension member.

In addition to one or more of the features described above, or as an alternative, the suspension member comprises a belt including a plurality of electrically conductive tension members and a compressible jacket at least partially surrounding the tension members.

In addition to one or more of the features described above, or as an alternative, the use indicator is based on a number of cycles that the suspension member has experienced during use of the elevator, and the mechanical characteristic indicator is based on at least one of a current load imposed on the suspension member and an elongation of the suspension member.

An illustrative example embodiment of an elevator system includes an elevator car; a suspension member that supports the elevator car and facilitates movement of the elevator car; and at least one processor configured to determine a condition of the suspension member based on a combination of an electrical inspection technique, a use indicator corresponding to an amount of use of the suspension member, and a mechanical characteristic indicator corresponding to at least one mechanical characteristic of the suspension member; and determine to remove the suspension member from service based on an indication from the electrical inspection technique, the mechanical characteristic indicator, and the use indicator satisfying at least one predetermined combination of criteria.

In addition to one or more of the features described above, or as an alternative, the least one processor is configured to determine to leave the suspension member in service when only the electrical inspection technique satisfies one of the criteria and neither of the mechanical characteristic indicator or the use indicator satisfies another one of the criteria.

In addition to one or more of the features described above, or as an alternative, the least one processor is configured to determine to remove the suspension member from service when the electrical inspection technique satisfies one of the criteria and at least one of the mechanical characteristic indicator or the use indicator satisfies another one of the criteria.

In addition to one or more of the features described above, or as an alternative, the least one processor is configured to instigate a shutdown of the elevator system based on determining to remove the suspension member from service.

In addition to one or more of the features described above, or as an alternative, the criteria include at least a first criterion, a second criterion, a third criterion, and a fourth criterion. The least one processor is configured to determine the condition of the suspension member based on the combination of the electrical inspection technique, the use indicator, and the mechanical characteristic indicator by: determining the condition of the suspension member based on the electrical inspection technique until the first criterion is satisfied wherein the electrical inspection technique indicates an undesired condition of the suspension member; subsequent to the first criterion being satisfied, determining the condition of the suspension member based on the use indicator and the mechanical characteristic indicator until the second criterion is satisfied wherein the use indicator exceeds a use threshold or the mechanical indicator exceeds a mechanical characteristic threshold; and subsequent to the second criterion being satisfied, determining whether the third criterion is satisfied wherein the mechanical characteristic indicator exceeds the mechanical threshold or the fourth criterion is satisfied wherein the use indicator exceeds the use threshold and the electrical inspection technique continues to indicate the undesired condition of the suspension member.

In addition to one or more of the features described above, or as an alternative, the least one processor is configured to determine to remove the suspension member from service by leaving the suspension member in service until determining that the third criterion is satisfied or the fourth criterion is satisfied.

In addition to one or more of the features described above, or as an alternative, the least one processor is configured to determine the condition of the suspension member based on the combination of the electrical inspection technique, the use indicator, and the mechanical characteristic indicator by determining that the first criterion is no longer satisfied if the electrical inspection technique no longer indicates the undesired condition of the suspension member and neither of the third or fourth criterion are satisfied.

In addition to one or more of the features described above, or as an alternative, the elevator system includes an electrical inspection device that is configured to provide an indication of an electrical resistance of at least one electrically conductive tension member of the suspension member to the at least one processor, a mechanical characteristic sensor configured to provide the mechanical characteristic indicator to the at least one processor, and a cycle counter configured to provide the use indicator to the at least one processor.

In addition to one or more of the features described above, or as an alternative, the mechanical characteristic sensor comprises at least one of a load sensor configured to provide an indication of a current load on the elevator car and an elongation detector configured to provide an indication of elongation of the suspension member.

The various features and advantages of an example embodiment will become apparent to those skilled in the art from the following detailed description. The drawings that accompany the detailed description can be briefly described as follows.

DETAILED DESCRIPTION

Embodiments of this invention provide enhanced monitoring of an elevator suspension member, such as a flat belt or a coated rope that includes tension members at least partially encased in a compressible coating. A combination of indicators of the condition of the suspension member and a combination of criteria provide a more robust indication of the actual condition of the suspension member, compared to relying on only one indicator. As a result, the expense, time and inconvenience associated with prematurely removing a suspension member from service before it is actually necessary can be avoided.

Figure 1:
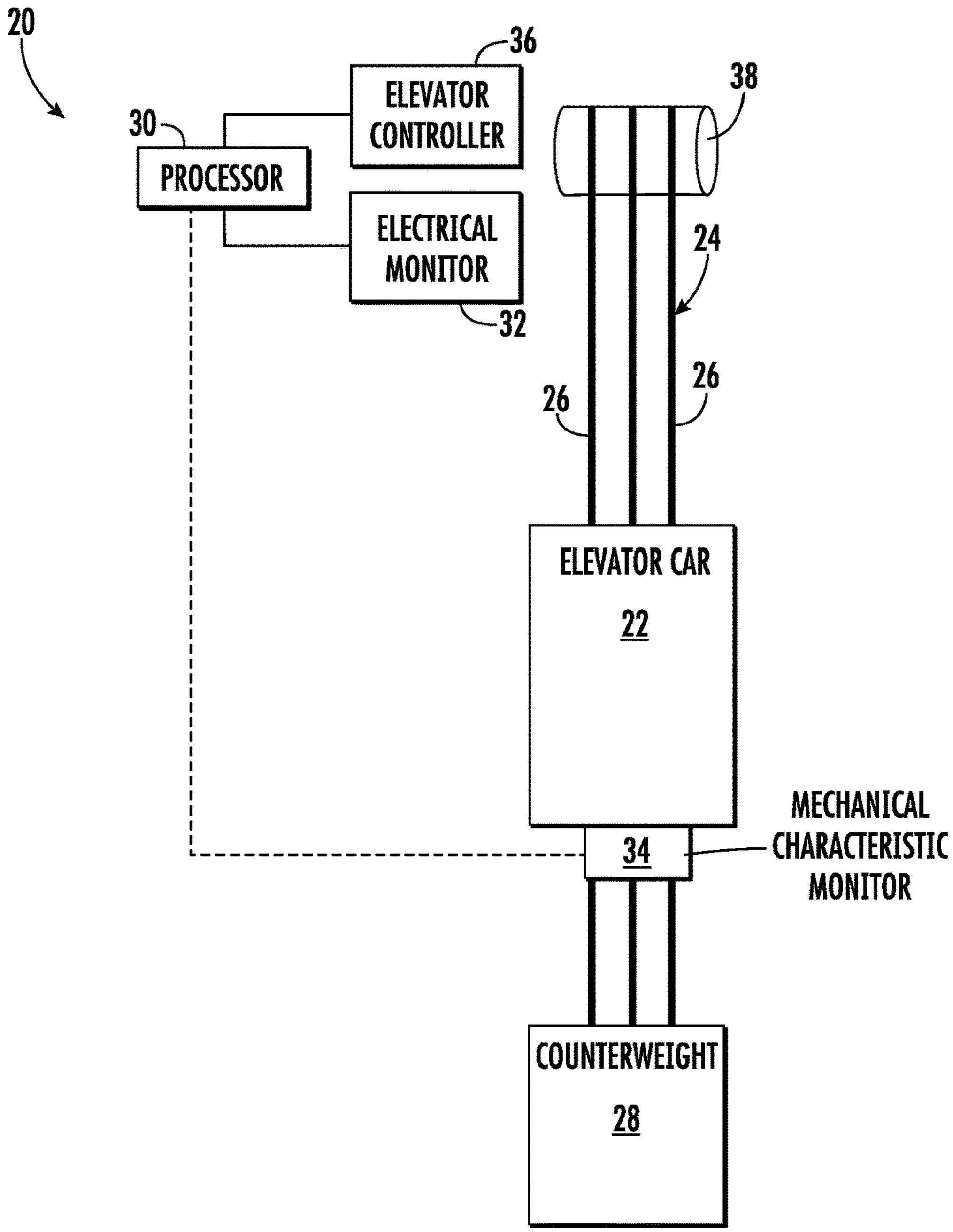
FIG. 1 schematically illustrates selected portions of an elevator system.

FIG. 1 schematically illustrates selected portions of an elevator system 20. An elevator car 22 is supported by a roping arrangement or suspension assembly 24 that includes a plurality of suspension members 26. The elevator car 22 is coupled to a counterweight 28 by the suspension members 26.

A suspension member monitoring device includes at least one processor 30 that is configured to determine a condition of each of the suspension members 26. The processor 30 in the illustrated example includes a computing device and associated memory. The processor 30 is programmed or otherwise configured to use different types of information indicative of the respective conditions of the suspension members 26 and a combination of criteria to determine when it is desirable or necessary to remove any one of the suspension members 26 from service.

An electric-based monitor 32 uses an electrical inspection technique and generates or provides a corresponding indication regarding a condition of each suspension member 26. The processor 30 receives the indication from the electric-based monitor 32.

In some example embodiments, the electric-based monitor 32 is configured to apply electricity to at least one of the tension members, such as a steel cord, of each suspension member 26 and to detect or measure the electrical resistance of the tension member. Changes in the electrical resistance indicate changes in a condition of the suspension member 26. Such resistance-based inspection techniques are known and need not be further described here.

The processor 30 also receives a mechanical characteristic indicator corresponding to at least one mechanical characteristic of the suspension members 26 from a mechanical characteristic detector 34, which may be associated with the elevator car 22. A variety of sensors or detectors are known that provide an indication of mechanical characteristics of the suspension members 26. One example mechanical characteristic is a current load on the elevator car 22, which will vary depending on how many passengers or items are within the elevator car 22. Another example mechanical characteristic is an amount of elongation of a suspension member 26, which may occur over time.

The processor 30 receives a use indicator from an elevator controller 36 that uses a known technique for providing information regarding an amount of use of the suspension members 26. The amount of use may be, for example, based on a number of bend cycles experienced by the suspension members 26. As known by those skilled in the art, bend cycles are associated with an amount of bending of the suspension members 26 as they move around a sheave, such as the traction sheave 38 schematically shown in FIG. 1. Other use indicators are included in some embodiments, such as a time during which the suspension member 26 has been in service or a number of runs completed by the elevator system.

The processor 30 utilizes the mechanical characteristic indicator, the use indicator and information from the electrical inspection technique to monitor the status or condition of the suspension members 26.

Figure 2:
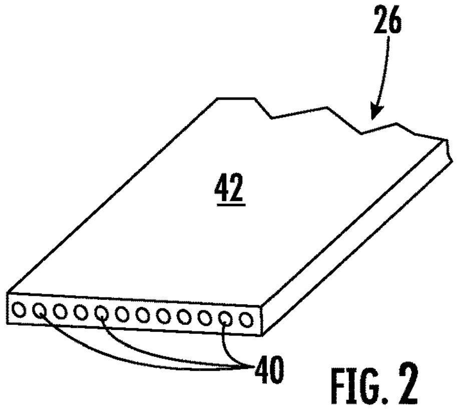
FIG. 2 schematically illustrates a portion of an example suspension member.

FIG. 2 schematically illustrates a portion of an example suspension member 26. In the illustrated embodiment, the suspension member 26 is a flat belt including a plurality of tension members 40 encased in a jacket 42 of a compressible material, such as polyurethane. In many embodiments, the tension members 40 comprise steel cords. Other embodiments include tension members that are made of different materials. The electrical inspection technique takes advantage of the electrically conductive nature of the tension members.

Figure 3:
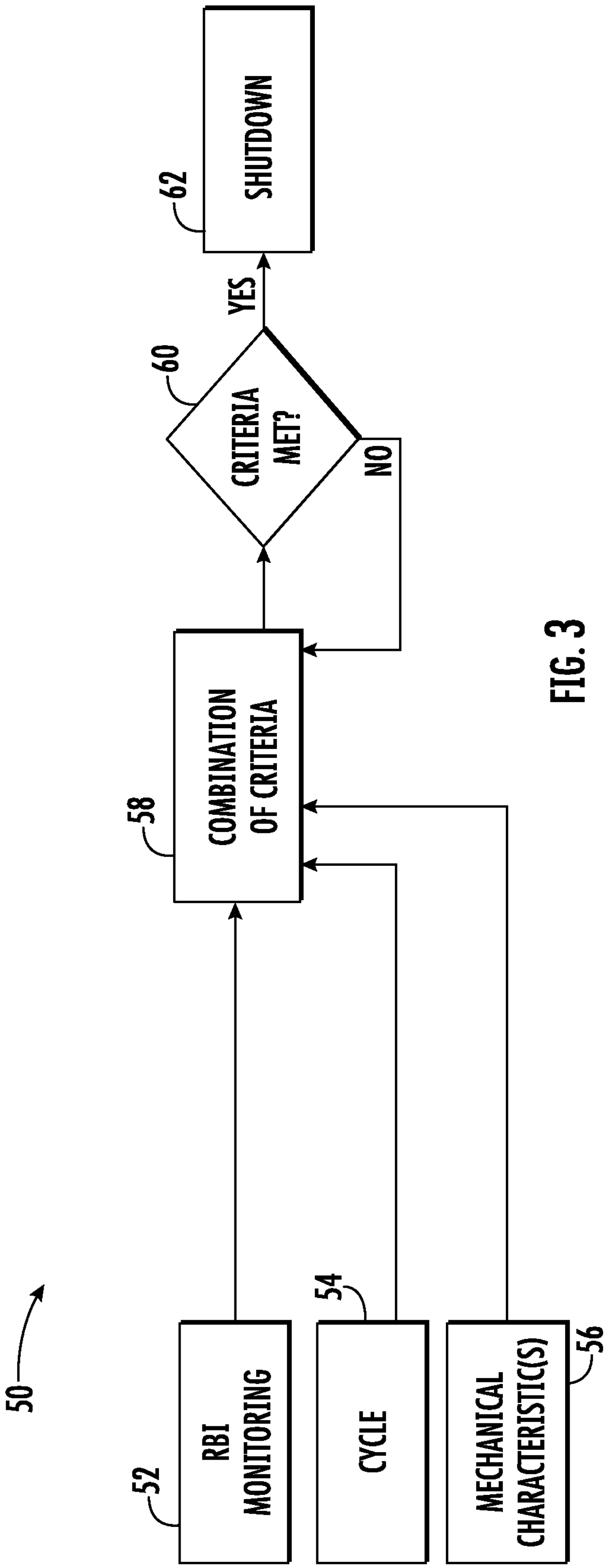
FIG. 3 is a flowchart diagram summarizing an example method of monitoring the suspension assembly of an elevator system.

FIG. 3 is a flowchart diagram 50 summarizing an example monitoring technique implemented by the processor 30. At 52, the electric-based monitor 32 performs a resistance-based inspection technique, which is one example of an electrical inspection technique that may be employed in the illustrated embodiment. At 54, the elevator controller 36 provides a use indicator to the processor 30. In this example, the use indicator is based on a number of bend cycles experienced by the suspension members 26 over time. At 56, the mechanical characteristic sensor 34 provides the mechanical characteristic indicator to the processor 30.

At 58, the processor 30 utilizes a combination of criteria to determine whether the output of the electrical inspection technique at 52, the use indicator at 54, and the mechanical characteristic indicator at 56 indicate a condition of any of the suspension members 26 that would warrant replacing the suspension member 26. The processor 30 determines whether those criteria are met at 60 and, if so, determines that the suspension member 26 should be removed from service and instigates a shutdown of the elevator at 62.

Figure 4:
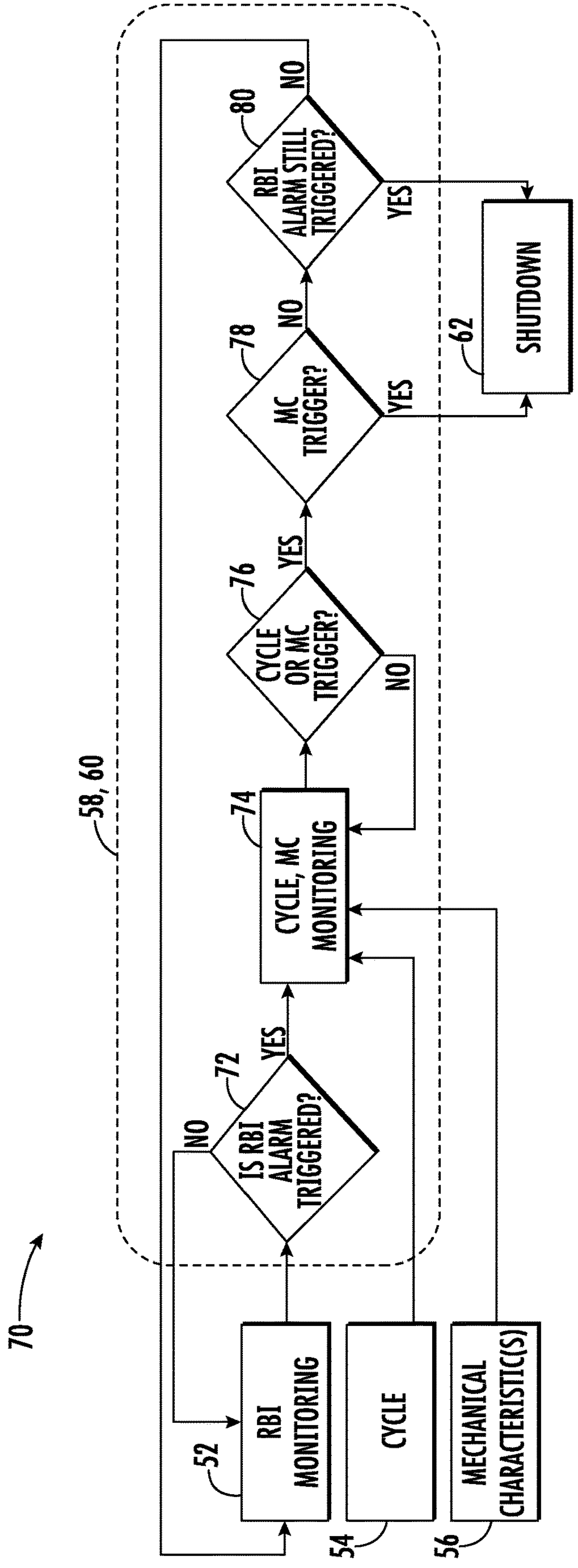
FIG. 4 is a flowchart diagram of an example implementation of the method summarized in FIG. 3.

FIG. 4 is a flowchart diagram that illustrates, in somewhat more detail, an example implementation of the technique shown in FIG. 3. According to the flowchart 70, the analysis and decisions made by the processor 30 at 58 and 60 include a determination at 72 whether the electrical monitoring technique satisfies a first criterion. For example, when the electrical monitoring technique is a resistance-based inspection technique, an alarm is triggered when the resistance reaches a value that corresponds to potential damage to one or more of the tension members of the suspension member 26. For example, if several wire strands of a tension member break, that increases the resistance of that tension member. Another possibility is that the tension member becomes stretched or thinner and the resulting electrical resistance increases. Under those conditions, the electrical inspection technique indicates an undesired condition of the suspension member.

After the first criterion is satisfied and the determination at 72 is positive, the processor 30 determines the condition of the suspension member based on the use indicator and the mechanical characteristic indicator at 74.

The processor 30 considers a second criterion at 76 to determine whether the second criterion is satisfied. In this example implementation, the second criterion is satisfied when the use indicator exceeds a use threshold or the mechanical characteristic indicator exceeds a mechanical characteristic threshold. If the second criterion is not met and the determination at 76 is negative, the processor 30 continues to utilize the use indicator and the mechanical characteristic indicator for purposes of determining the condition of the suspension member.

Once the second criterion is satisfied at 76, the processor 30 considers a third criterion at 78. In this example implementation, the third criterion is satisfied when the mechanical characteristic indicator exceeds the mechanical characteristic threshold. If so, the processor 30 considers a fourth criterion at 80. In this example implementation, the fourth criterion corresponds to the electrical inspection technique alarm still being triggered, such as when the resistance indication remains in a range that corresponds to an undesired condition of the suspension member.

As can be appreciated from the flowchart 70, the fourth criterion is satisfied at 80 when the use indicator exceeds the use threshold and the electrical inspection technique continues to indicate the desired condition of the suspension member.

When the processor 30 determines that the third criterion is satisfied at 78 or the fourth criterion is satisfied at 80, the processor 30 determines that the suspension member 26 should be removed from service. The processor 30 instigates a shutdown of the elevator system at 62, which may include providing a command to the elevator controller 36 and sending a communication to a remotely located device that makes an appropriate service call.

According to the example shown in FIG. 4, in a situation where the use indicator satisfies the second criteria, as determined at 76, but the electrical inspection technique no longer indicates an undesired condition of the suspension member and neither of the third or fourth criteria are satisfied, the processor 30 determines that the condition of the suspension member 26 is satisfactory for leaving the suspension member 26 in service.

As can be appreciated from the preceding description and the drawings, the example technique and system include determining to leave the suspension member 26 in service when only the electrical inspection technique satisfies one of the criteria and neither of the mechanical characteristic indicator or the use indicator satisfies another one of the criteria. The suspension member is removed from service when the electrical inspection technique satisfies one of the criteria and at least one of the mechanical characteristic indicator or the use indicator satisfies another one of the criteria. A shutdown of the elevator system is only instigated when a combination of the criteria is satisfied.

By not determining to remove a suspension member 26 from service and shutting down the elevator system 20 based solely on the electrical inspection technique, it becomes possible to extend the service life of a suspension member by avoiding a situation in which an electrical inspection technique alarm is triggered while the suspension member condition is satisfactory for continued use to provide elevator service. According to the example shown in FIG. 4, the suspension member 26 is left in service until the first and second criteria are satisfied and at least one of the third criterion or the fourth criterion is also satisfied.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of monitoring a suspension member of an elevator system, the method comprising:

determining a condition of the suspension member based on a combination of an electrical inspection technique, a use indicator corresponding to an amount of use of the suspension member, and a mechanical characteristic indicator corresponding to at least one mechanical characteristic of the suspension member;

determining to leave the suspension member in service when only the electrical inspection technique satisfies at least one undesired criteria and neither of the mechanical characteristic indicator or the use indicator satisfies another predetermined criteria; and determining to remove the suspension member from service based on an indication from the electrical inspection technique indicating the undesired criteria of the suspension member and at least one of the mechanical characteristic indicator, and the use indicator satisfying one other predetermined criteria.

2. The method of claim 1, comprising instigating a shutdown of the elevator system based on determining to remove the suspension member from service.

3. The method of claim 1, wherein the criteria include at least a first criterion, a second criterion, a third criterion, and a fourth criterion;

and determining the condition of the suspension member based on the combination of the electrical inspection technique, the use indicator, and the mechanical characteristic indicator comprises:

determining the condition of the suspension member based on the electrical inspection technique until the first criterion is satisfied wherein the electrical inspection technique indicates an undesired condition of the suspension member;

subsequent to the first criterion being satisfied, determining the condition of the suspension member based on the use indicator and the mechanical characteristic indicator until the second criterion is satisfied wherein the use indicator exceeds a use threshold or the mechanical characteristic indicator exceeds a mechanical characteristic threshold; and subsequent to the second criterion being satisfied, determining whether the third criterion is satisfied wherein the mechanical characteristic indicator exceeds the mechanical characteristic threshold or the fourth criterion is satisfied wherein the use indicator exceeds the use threshold and the electrical inspection technique continues to indicate the undesired condition of the suspension member.

4. A non-transitory storage medium containing a plurality of processor-executable instructions that, when executed by at least one processor, cause the at least one processor to perform the method of claim 3.

5. The method of claim 3, wherein determining to remove the suspension member from service comprises leaving the suspension member in service until determining that the third criterion is satisfied or the fourth criterion is satisfied.

6. The method of claim 3, wherein determining the condition of the suspension member based on the combination of the electrical inspection technique, the use indicator, and the mechanical characteristic indicator further comprises:

determining that the first criterion is no longer satisfied if the electrical inspection technique no longer indicates the undesired condition of the suspension member and neither of the third or fourth criterion are satisfied.

7. The method of claim 1, wherein the electrical inspection technique comprises determining an electrical resistance of at least one electrically conductive tension member of the suspension member.

8. The method of claim 7, wherein the suspension member comprises a belt including a plurality of electrically conductive tension members and a compressible jacket at least partially surrounding the tension members.

9. The method of claim 1, wherein the use indicator is based on a number of cycles that the suspension member has experienced during use of the elevator, and the mechanical characteristic indicator is based on at least one of a current load imposed on the suspension member and an elongation of the suspension member.

10. The method of claim 1, wherein:

the electrical inspection technique comprises an electric-based monitor configured to apply electricity to at least one tension member in the suspension member to determine an electrical resistance of the tension member;

the use indicator comprises an elevator controller associated with at least one processor, wherein the elevator controller determines the amount of use based on a number of bend cycles experienced by the suspension member, a time during which the suspension member has been in service, or a number of runs completed by the elevator system; and the mechanical characteristic indicator comprising a mechanical characteristic sensor that is in communication with the at least one processor to determine a current load on the elevator car or an amount of elongation of the suspension member over time.

11. An elevator system, comprising:

an elevator car;

a suspension member that supports the elevator car and facilitates movement of the elevator car; and at least one processor configured to determine a condition of the suspension member based on a combination of an electrical inspection technique, a use indicator corresponding to an amount of use of the suspension member, and a mechanical characteristic indicator corresponding to at least one mechanical characteristic of the suspension member;

determine to leave the suspension member in service when only the electrical inspection technique satisfies at least one undesired criteria and neither of the mechanical characteristic indicator or the use indicator satisfies another predetermined criteria; and determine to remove the suspension member from service based on an indication from the electrical inspection technique, indicating the undesired criteria of the suspension member and at least one of the mechanical characteristic indicator, and the use indicator satisfying one other predetermined criteria.

12. The elevator system of claim 11, wherein the least one processor is configured to instigate a shutdown of the elevator system based on determining to remove the suspension member from service.

13. The elevator system of claim 11, wherein the criteria include at least a first criterion, a second criterion, a third criterion, and a fourth criterion;

and the least one processor is configured to determine the condition of the suspension member based on the combination of the electrical inspection technique, the use indicator, and the mechanical characteristic indicator by:

determining the condition of the suspension member based on the electrical inspection technique until the first criterion is satisfied wherein the electrical inspection technique indicates an undesired condition of the suspension member;

subsequent to the first criterion being satisfied, determining the condition of the suspension member based on the use indicator and the mechanical characteristic indicator until the second criterion is satisfied wherein the use indicator exceeds a use threshold or the mechanical characteristic indicator exceeds a mechanical characteristic threshold; and subsequent to the second criterion being satisfied, determining whether the third criterion is satisfied wherein the mechanical characteristic indicator exceeds the mechanical characteristic threshold or the fourth criterion is satisfied wherein the use indicator exceeds the use threshold and the electrical inspection technique continues to indicate the undesired condition of the suspension member.

14. The elevator system of claim 13, wherein the least one processor is configured to determine to remove the suspension member from service by leaving the suspension member in service until determining that the third criterion is satisfied or the fourth criterion is satisfied.

15. The elevator system of claim 13, wherein the least one processor is configured to determine the condition of the suspension member based on the combination of the electrical inspection technique, the use indicator, and the mechanical characteristic indicator by:

determining that the first criterion is no longer satisfied if the electrical inspection technique no longer indicates the undesired condition of the suspension member and neither of the third or fourth criterion are satisfied.

16. The elevator system of claim 11, comprising:

an electrical inspection device that is configured to provide an indication of an electrical resistance of at least one electrically conductive tension member of the suspension member to the at least one processor;

a mechanical characteristic sensor configured to provide the mechanical characteristic indicator to the at least one processor; and a cycle counter configured to provide the use indicator to the at least one processor.

17. The elevator system of claim 16, wherein the mechanical characteristic sensor comprises at least one of a load sensor configured to provide an indication of a current load on the elevator car and an elongation detector configured to provide an indication of elongation of the suspension member.

18. The elevator system of claim 11, wherein:

the electrical inspection technique comprises an electric-based monitor configured to apply electricity to at least one tension member in the suspension member to determine an electrical resistance of the at least one tension member;

the use indicator comprises an elevator controller associated with the at least one processor, wherein the elevator controller determines the amount of use based on a number of bend cycles experienced by the suspension member, a time during which the suspension member has been in service, or a number of runs completed by the elevator system; and the mechanical characteristic indicator comprising a mechanical characteristic sensor that is in communication with the at least one processor to determine a current load on the elevator car or an amount of elongation of the suspension member over time.

* * * * *